United States Patent [19]

Cavanagh

[11] Patent Number: 4,542,361
[45] Date of Patent: Sep. 17, 1985

[54] PERMANENT MAGNET FIELD DIVERTED TO DO USEFUL WORK

[75] Inventor: Patrick E. Cavanagh, Toronto, Canada

[73] Assignee: Maghemite Inc., Mississauga, Canada

[21] Appl. No.: 612,242

[22] Filed: May 21, 1984

[51] Int. Cl.⁴ .............................................. H01F 7/00
[52] U.S. Cl. .................................... 335/230; 335/289; 335/290
[58] Field of Search ............... 335/229, 230, 289, 290, 335/291, 294

[56] References Cited

U.S. PATENT DOCUMENTS

| | | | |
|---|---|---|---|
| 3,146,381 | 8/1964 | Moreau | 335/289 X |
| 3,167,694 | 1/1965 | Bekedam | 335/306 X |
| 3,621,424 | 11/1971 | Query | 335/306 |
| 4,020,433 | 4/1977 | Uchiodoi et al. | 335/230 |

FOREIGN PATENT DOCUMENTS

| | | | |
|---|---|---|---|
| 1557321 | 1/1969 | France | 335/291 |
| 688402 | 3/1953 | United Kingdom | 335/306 |

Primary Examiner—George Harris
Attorney, Agent, or Firm—Sim & McBurney

[57] ABSTRACT

Permanent magnets are used to perform useful work. The field of a first permanent magnet is diverted by electromagnetic coils to such a low value that another opposing permanent magnet can approach the first magnet without the application of undue force. The field in the first magnet is restored to act on the second magnet so as to repel it. The force which results may be harnessed to effect reciprocal or rotary motion.

10 Claims, 6 Drawing Figures

FORCE IN OUNCES

FIG.6.

ROTATION OF ONE ROTOR MAGNET AT 360 R.P.M. PAST ONE STATOR MAGNET.

PERMANENT MAGNET FIELD DIVERTED TO DO USEFUL WORK

FIELD AND BACKGROUND OF INVENTION

The present invention relates to the utilization of magnets, and especially to the development of usable power from assemblies of permanent magnets, which exert a magnetic field of varying intensity, depending on the strength of the magnet. To the inventor's knowledge, permanent magnets have not been used in the manner set forth herein to develop usable power.

SUMMARY OF INVENTION

In accordance with the present invention, the field of a permanent magnet is diverted by an opposing electromagnetic field to such a low value that another opposing permanent magnet can approach the first magnet without the application of undue force. The field in the first magnet then is released to act on the second magnet so as to repel it. In this way, usable amounts of power are developed and an efficient manner of utilization of permanent magnets to transfer energy is provided.

DESCRIPTION OF PREFERRED EMBODIMENTS

Figure 1:
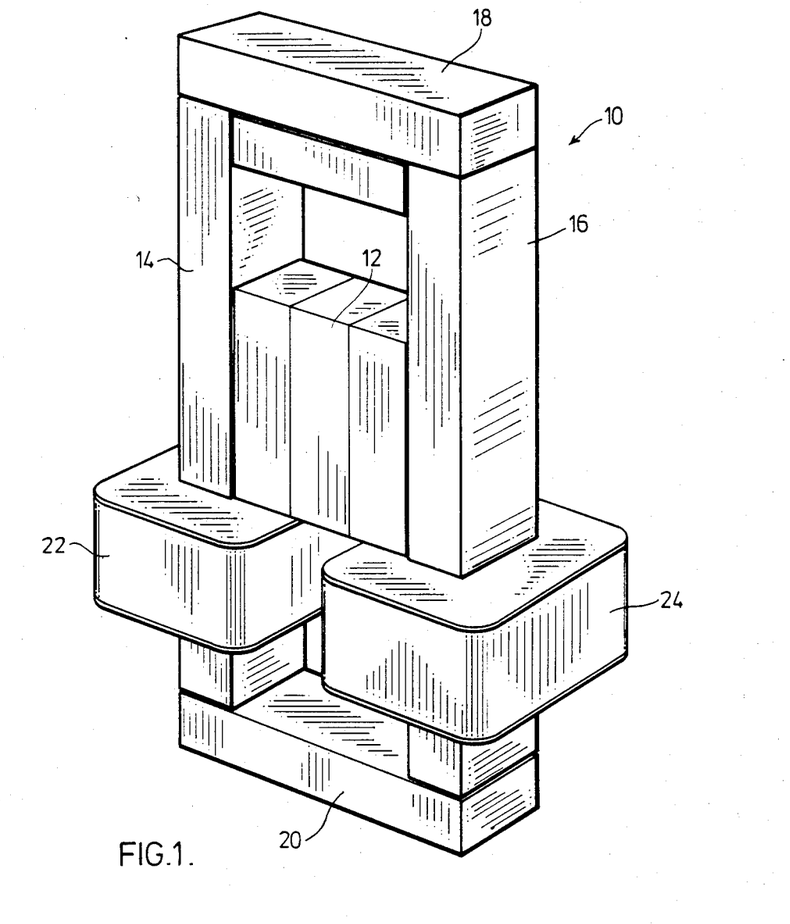
FIG. 1 is an end view of an "H"-shaped magnetic assembly embodying the principles of the invention.

Referring first to FIG. 1, an H-shaped magnet assembly 10 comprises high intensity strontium ferrite permanent magnets 12, shown to be three in number but any convenient number may be employed. The magnets 12 may have any convenient shape, typically elongate and of rectangular cross-section. Parallel arms 14 and 16 of mild steel or other ferromagnetic material are positioned in contact with the permanent magnets 12 and possess, at their longitudinal ends, the polarity of the respective permanent magnets 12. For example, the arm 14 may have north (N) poles at its longitudinal ends while the arm 16 has south (S) poles at its longitudinal ends. The arms 14 amd 16 may be of any convenient construction, typically elongate and of square or rectangular cross-section. Magnetic field balancers 18 and 20 extend across the upper and lower ends respectively of the arms 12 and 14 and comprise cross-pieces of mild steel or other ferromagnetic material and of any convenient construction, typically elongate and of square or rectangular cross-section.

Electromagnetic coils 22 and 24 are mounted one on each of the arms 14 and 16 adjacent the lower end thereof and below the permanent magnets 12. A magnetic field is developed in each coil 22 and 24 when D.C. voltage of low value is applied thereto. The coils are positioned, and energized so that, the upper end of each coil there is developed a pole opposite to the pole of the adjacent permanent magnet 12.

As the coils 22 and 24 are energized to provide increasing field strength, a magnetic field, opposite and equal in value to that of the permanent magnets is developed, and magnetic flux then will flow only in the top half of the H-structure, and not in the bottom half, so that the original magnetic field in the bottom half of the H-structure is effectively diverted, causing the lower cross-piece 20 to fall from the lower end of the assembly 10 as the force of gravity overcomes the magnetic force of the field produced at the lower end of the mild steel arms 14 and 16.

Care should be taken to match the magnetic circuit in the upper and lower halves of the H-structure to avoid having to use opposing fluxes which are so great that some demagnetization of the ferrite permanent magnets 12 can take place.

Figure 2:
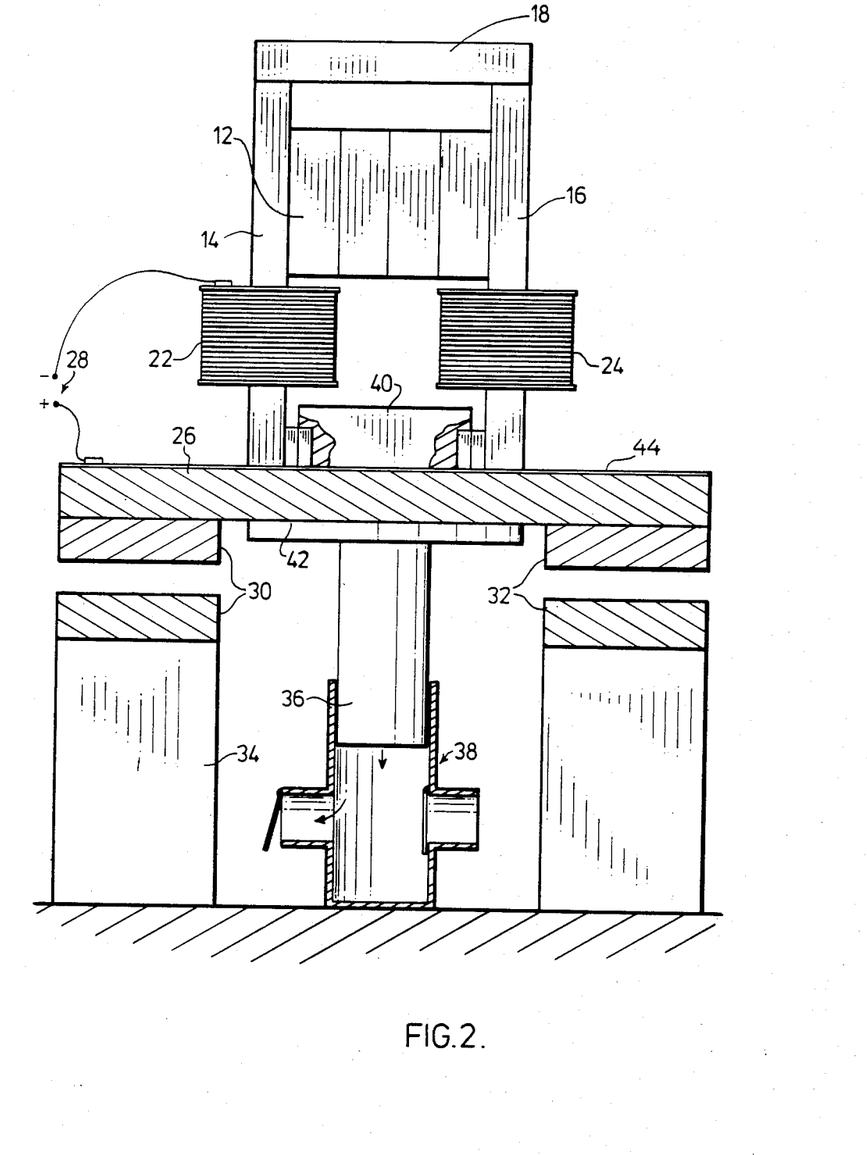
FIG. 2 is an end view of a vertical hammer arrangement constructed from the H-shaped magnetic assembly of FIG. 1.

This effect may be used to do useful work, as illustrated in FIG. 2, wherein a hammer bar 26 is used in place of the cross-piece 20. The hammer bar 26 may be constructed of any convenient electroconductive ferromagnetic material, such as, a mild steel bar. A d.c. battery 28, or other source of d.c. power, is connected to the arrangement to form an openable closed circuit with the coils 22 and 24. As illustrated, the positive side of the battery is connected to the hammer bar 26 while the negative side is connected to both the negative lead sides of coils 22 and 24. The positive lead sides of these coils are connected to the upright arms 14 and 16. The negative side of coil 22 is adjacent the north pole side of permanent magnets 12 while the positive side of coil 24 is adjacent the south pole side of permanent magnets 12.

The hammer bar 26 is attracted by the permanent magnets 12 towards the lower ends of the side arms 14 and 16. Upon engagement, the electrical circuit from the battery through the coils 22 and 24 is complete and magnetic fields are generated by the coils 22 and 24, causing the field of the permanent magnets 12 to be opposed and diverted from the lower end of the arms 14 and 16, permitting the hammer bar 26 to fall and break the circuit, thereby deenergizing the coils. Upon deenergizing the coils, the magnetic field therein subsides and the field of the permanent magnets is reestablished at the lower end of the arms 14 and 16 and the operations of attraction, circuit completion, field generation and hammer bar release are repeated, and are continued to be repeated until such time as electrical disconnection from the battery 28 occurs.

The hammering frequency may be varied by varying the strength of the permanent magnets 12 employed and also by varying the size and weight of the hammer bar 26. For example, the hammering frequency may be ten strokes per second or more. Spring action at the lower end of each stroke of the hammer bar 26 may be achieved by providing pairs of magnets 30 and 32 of opposing poles, one member of each magnet pair being mounted to the hammer bar 26 and the other member being mounted to a stationary support structure 34.

The hammer bar 26 may be attached to the movable piston 36 of a water or air pump 38, so that the vertically-reciprocal motion of the hammer bar 26, mentioned above, operates the pump 38.

In view of the various magnetic fields which are developed, the hammer bar 26 tends to try to rotate in addition to its vertically-reciprocal motion. This tendency may be utilized by providing a rotating circular hammer bar 26, or can be overcome by placing an additional permanent magnet 40 on top of the hammer bar 26, as illustrated, with the poles of the magnet 40 opposing the polarity of the arms 14 and 16 of the H-magnet. V-shaped mild steel notches 42 are provided on the facing walls of the arms 14 and 16, so that the magnet 40 rides between these notches 42 and the opposed polarity ensures that the hammer bar 26 remains aligned without contact friction.

If desired, a spacer which also acts as an electrical contact may also be employed in conjunction with the hammer bar 26 to prevent actual contact between the hammer bar 26 and the lower ends of the mild steel arms 14 and 16. The strength of the magnetic field increases exponentially as the hammer bar 26 approaches the mild steel poles of the bars 14 and 16. If the hammer bar 26 comes in actual contact with these poles, and the magnetic field is subsequently turned off or diverted, then the hammer bar 26 drops under the influence of gravity. The hammer bar 26 becomes slightly magnetized temporarily upon contact with the poles, which slows the rate of its escape from the mild steel poles. Interposing a thin piece 44 of electrically-conducting non-magnetic material, such as, copper or aluminum, between the hammer bar 26 and the poles, prevents the steel bar and the hammer from encountering the full strength of the magnetic field at the poles. The hammer bar 26 therefore, is not magnetized as strongly and begins its fall under the influence of gravity from a weaker field strength location further from the poles, so that the rate of escape is increased.

Figure 3:
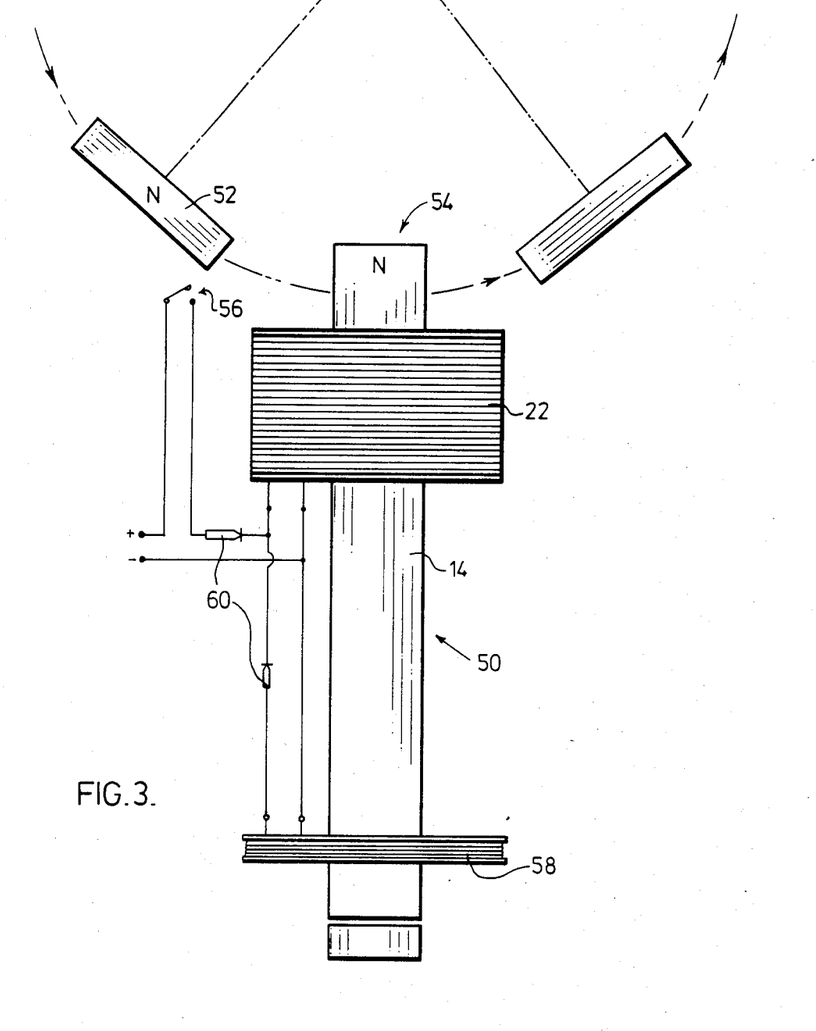
FIG. 3 is a side view of a rotary device using a H-shaped magnet assembly.

Turning now to FIG. 3, there is illustrated therein the application of the principles of FIGS. 1 and 2 to effect rotary motion as opposed to reciprocal motion. In the arrangement of FIG. 3, the H-magnet structure of FIGS. 1 and 2 is inverted and the lower bar 20 or 26 omitted, leaving a gap between the poles at the upper ends of the mild steel arms 14 and 16. The H-magnet arrangement 50 is shown in an end view in FIG. 3.

Permanent magnets 52, in the form of a side-by-side pair of multiple pair are radially-mounted with respect to an axle (not shown) for rotation through the gap 54 between the mild steel arms 14 and 16. The permanent magnets 52 may be of any convenient construction, typically elongate and of square or rectangular cross-section, and may be strontium ferrite magnets.

The permanent magnets 52 are arranged with the pole which is to pass closer to the respective arm 14 or 16 being the same as the polarity of that arm. As the magnets 52 move in their arc towards the gap 54, the coils 22 and 24 are energized by d.c. power, developing an opposing magnetic field which neutralizes or reverses the magnetic field which is within the gap 54. The permanent magnets 52, therefore, are not repulsed by the field in the gap 54 but rather are slightly attracted by the non-magnetized steel arms. When the magnets 52 enter the gap 54 or have passed a short way beyond the gap 54, the coils 22 and 24 are deenergized, thereby eliminating the neutralizing effect of the opposing field generated thereby, so that the polarity of the arms 14 and 16 and the resulting magnetic field in the gap 54 is restored, thereby producing a repulsion effect on the magnets 52, driving the magnets 52 out of the gap 54. The repulsion effect is converted into rotational motion of the magnets 52.

The magnetic poles of the arms 14 and 16, therefore, are effectively turned off and on by activation and deactivation of the coils 22 amd 24 enabling motive force to be applied to an axle by rotation of the magnets 52. The rotor, therefore, is driven wholly by magnetic forces, with the magnets 12 constituting a source of part of the energy.

The approach of the rotating magnets 52 to the gap 54 may be sensed by a suitably positioned magnetic sensor 56, or other suitable motion activated switching device, such as, a mechanical roller switch, photocells or an electrical contact commutator system, so that, upon closing of the switch 56, the opposing field in the gap 54 may be turned off, decreased or slightly reversed, as the magnets 52 swing towards the centre of the gap 54. The magnets 52 may be provided with a critical length in the direction of rotation, so that, upon passing beyond the magnetic switch 56 and thereby opening the switch 56 and deactivating the coils 22 and 24, the magnets 52 are positioned in the gap 54. Upon deactivation of the coils 22 and 24 and the field produced thereby, the restored opposing field in the gap 54 then repulses the magnets 52 in the direction of their rotation.

The magnetic flux which is established in the system by the coils 22 and 24 may be discharged to further coils 58, thereby generating a reverse or counter emf magnetic field, which assists in accelerating the moving magnets 52. Diodes 60 may be provided in the circuit to prevent sparking at the magnetic switch 56 and to pass the counter emf field to a transformer or to charge a battery.

The sequence of operations noted above can be repeated many times in the full cycle of the rotor and more than one set of rotating magnets may be provided in diametrically-opposed positions with respect to the axle. The electric energy required for the short pulse of current through the coils 22 and 24 that diverts the magnetic field in the magnets 14 and 16 is relatively small, and operates for a very short period, about 1/10 of a second.

As may be seen from FIGS. 1 to 3, the present invention provides both method and apparatus for utilizing the magnetic field of permanent magnets to do useful work.

EXAMPLES

Example 1

The H-shaped magnet assembly of FIG. 1 was set up. Three permanent strontium ferrite magnets 12 were used, each one inch square and four inches long, providing a remnant magnetism of 3400 gauss. Mild steel arms 14 and 16 were one-inch square and 10 inches long, establishing a north pole at the top and bottom of the left hand arm and a south pole at the top and bottom of the right hand arm. Mild steel cross-pieces 18 and 20 were one-inch square and 5 inches long.

Two coils 22 and 24 were wound to have dimensions 3 inches outside diameter 1.375 inches inside diameter and 2 inches long, using 750 turns of No. 18 enamelled wire. The resistance of each coil was 3.5 ohms. The magnetic field produced by the coils were determined for different applied voltages. The results of such determinations are reproduced in the following Table I:

TABLE I

| Test Voltage (dc volts) | Current (amps) | Magnetic Field (gauss) | |
|---|---|---|---|
| | | Calculated* | Measured at Core Centre |
| 1 | 0.175 | 164.9 | 150 |
| 2 | 0.600 | 565.4 | 400 |
| 3 | 1.000 | 942.5 | 800 |
| 4 | 1.200 | 1131.0 | 1000 |
| 5 | 1.500 | 1413.7 | 1200 |
| 6 | 1.800 | 1696.5 | 1400 |

*Calculated field = 0.4 × amps × turns.

Using those coils and the structure discussed above, the field necessary to be produced by the coils to enable the field from a series of strontium magnets to be diverted sufficiently to permit the lower cross-piece 20 to drop was determined, and the results are reproduced in the following Table II:

TABLE II

| | (gauss) | |
|---|---|---|
| Test | Magnet Field | Release Field |
| A | 200 | 140 |
| B | 400 | 236 |
| C | 700 | 330 |
| D | 1500 | 1130 |

In this series of tests, the H-magnet field strength at the poles due to the permanent magnets was measured. Different sizes and shapes of strontium ferrite magnets were used to give the different field stengths shown in the four tests.

The electromagnetic field generated by the coils was then increased in each case until the weight fell. The required field to release the weight was calculated as the measured amperes at that time multiplied by the coil turns and the factor 0.4. The field required to release the weight then was in each case slightly lower than the measured permanent magnet field which was to be diverted in order to drop the weight.

Example 2

The apparatus illustrated in FIG. 2 was set up. The H-magnet assembly comprises four strontium ferrite magnets 12, each 6×4×1 inches and producing a total field of 3400 gauss. The mild steel arms 14 and 16 were each 10×4×1½ inches and the mild steel keeper 18 was 7×1×⅛ inches. The mild steel hammer bar 26 weighed 46 lbs, was dimensioned 20×4½×1¼ inches and, in some experiments, had an aluminum spacer 44 dimensioned 20×4½×1/16 inch on its top surface. The coils had outside dimensions of 7×5×3 inches and a centre opening of 4×1½ inches. The coil wound on this form was 2 inches long and consisted of 350 turns of double #18 wire.

A series of experiments was carried out to determine the efficiency of use of the available energy by the hammer bar 26 in pumping operations. The results are reproduced in the following Table III:

TABLE III

| | MAIN VARIABLES | | ENERGY IN | | | | COUNTER EMF | |
|---|---|---|---|---|---|---|---|---|
| Test No. | Spacer | Frequency (Herz) | Volts | Amps | Pulse Duration-secs | Watts Supplied | Volts | Milliamps |
| 1 | No | 3.3 | 12 | 5.2 | .20 | 41.2 | 9 | 50 |
| 2 | Yes | 5.0 | 12 | 2.8 | .10 | 16.8 | 5 | 135 |
| 3 | Yes | 5.6 | 12 | 1.7 | .10 | 11.32 | 5 | 135 |

| | COUNTER EMF | | HAMMER ENERGY USE | | | |
|---|---|---|---|---|---|---|
| Test No. | Pulse Duration-secs | Watts Lost | Hammer Travel-ins. | Ft-lbs Per Second | Watts Used | EFFICIENCY % |
| 1 | .06 | .09 | 5/32" | 2.0 | 2.71 | 6.59 |
| 2 | .10 | .34 | ⅜" | 2.39 | 3.25 | 19.75 |
| 3 | .08 | .28 | ⅜" | 3.09 | 4.20 | 38.00 |

As may be seen from the results of the above Table III, part of the available energy was used by the hammer to effect a pumping action.

Example 3

An apparatus as illustrated in FIG. 3 was set up, with the dimensions and types of materials of the H-magnet structure being as described above with respect to Example 1. Strontium ferrite magnets dimensioned 6×1×1 inches were attached at opposite ends of a 10-inch radius arm. A sensitive balance measuring ounces was attached to the end of the rotor arm and used to measure the actual force in ounces as the rotor was slowly moved by hand around the circumference of the circle. Since the rotor arm was 10 inches in radius, the resulting torque in ounce-inches was the product of ounces measured times 10.

The torque developed in the rotating magnets was recorded for various angular positions of the rotating magnets with respect to the H-magnet assembly. The results were plotted graphically and appear in FIG. 4.

Figure 5:
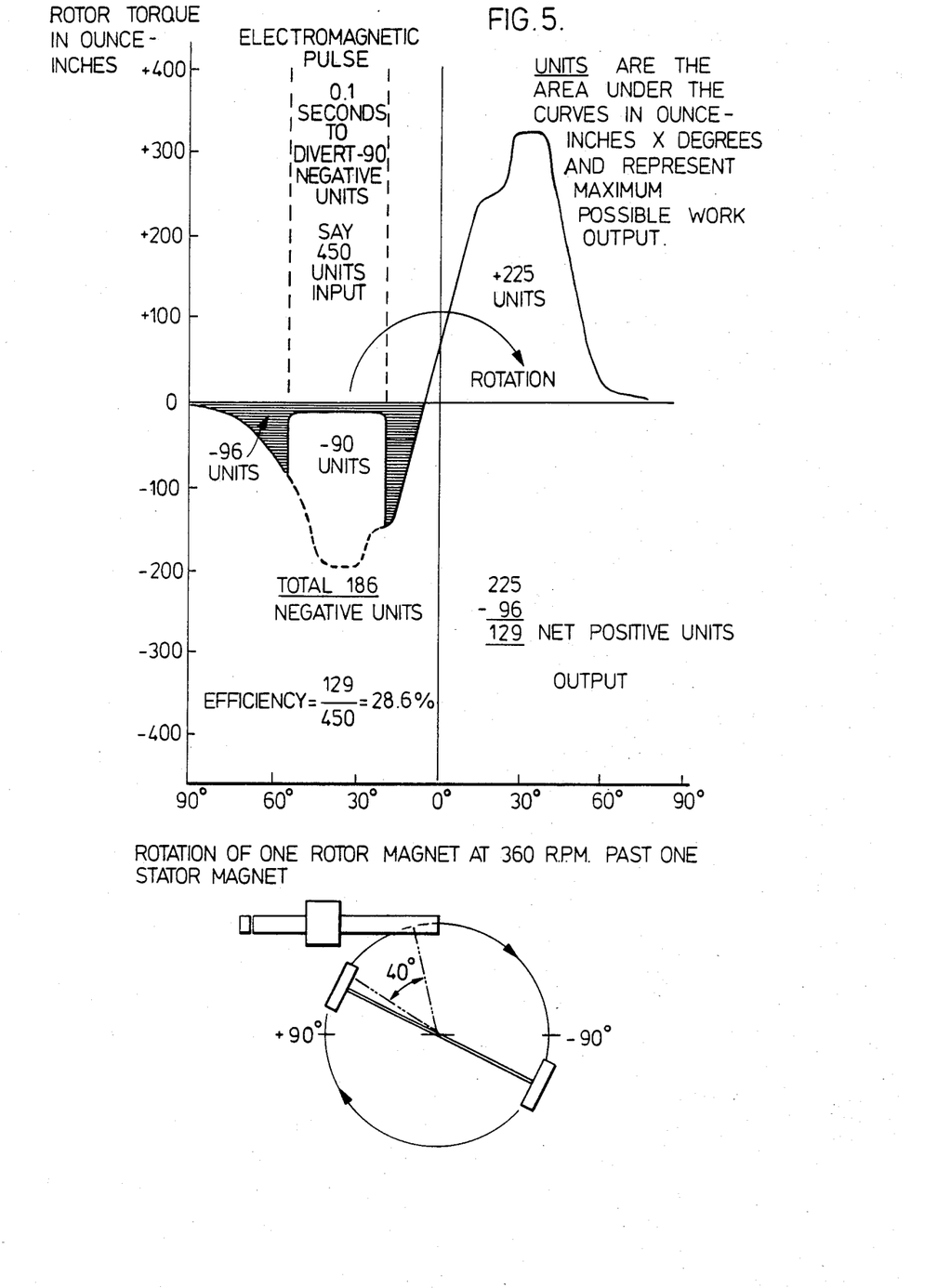
FIG. 5 is a graphical illustration of the development of torque using an alternative arrangement or rotor and H-shaped magnet assembly for rotation in one direction.

In another experiment, see FIG. 5, the arms 14 and 16 were lengthened and the H-magnet assembly was positioned tangentially to the rotor, so that the magnet flux was no longer symmetrical about the point where the flux reverses. The torque developed in the rotating magnets was plotted graphically and appears in FIGS. 5 and 6 for clockwise and counterclockwise rotation.

Figure 6:
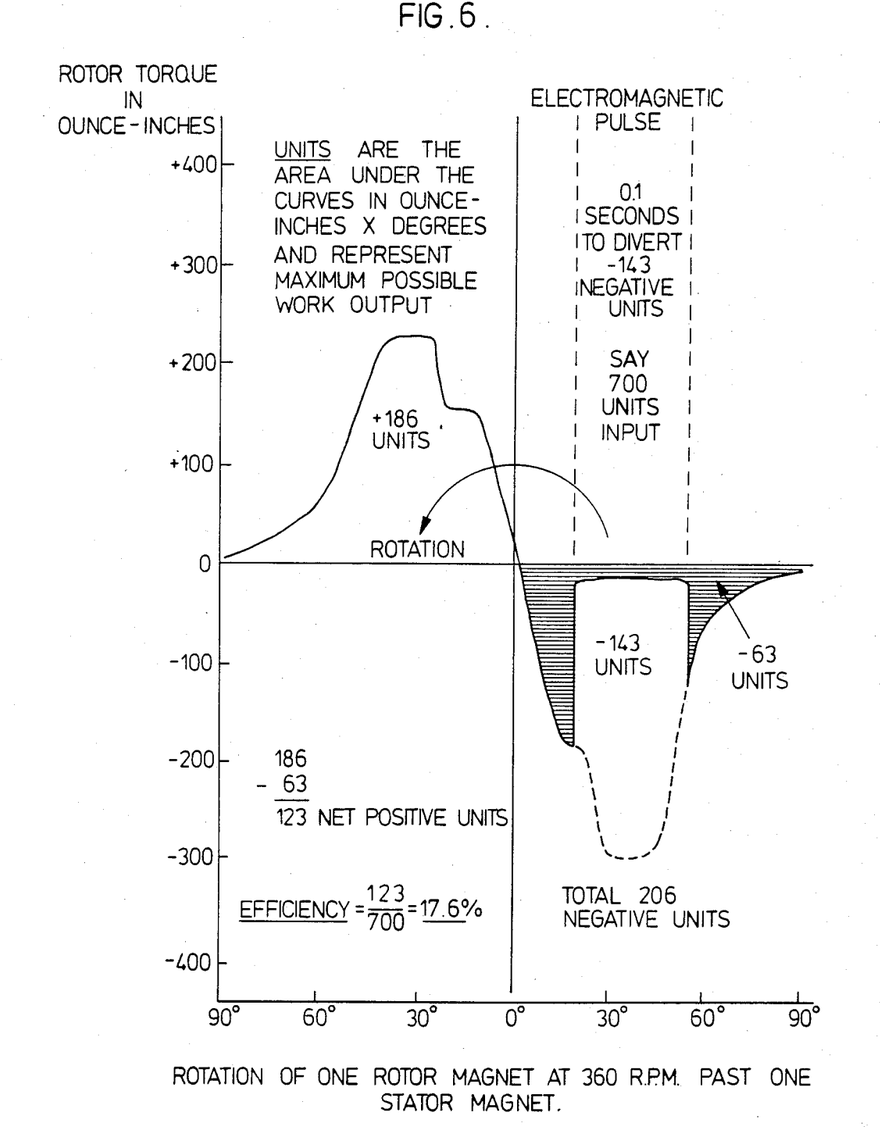
FIG. 6 is a graphical illustration of the development of torque using the alternative arrangement for rotation in the opposite direction.

When the area under the curves of FIGS. 5 and 6 is measured, then it can be expressed in "units", which are proportional to the energy available and, if utilized, proportional to the work done.

The magnetic flux in the gap between the H-magnet pole and the rotor magnet was determined. For efficient operation, this gap usually should be small, less than one-sixteenth of an inch, but for ease of operation and experimentation, a relatively large gap of one-half inch was used. The required ampere turns through the coils to divert this field was sufficient to provide a counter-flux of about five times the gap flux. As a result of inefficiencies and losses in the H-magnet set up and in the gap, the required pulse was about five times the measured flux in the gap.

Figure 4:
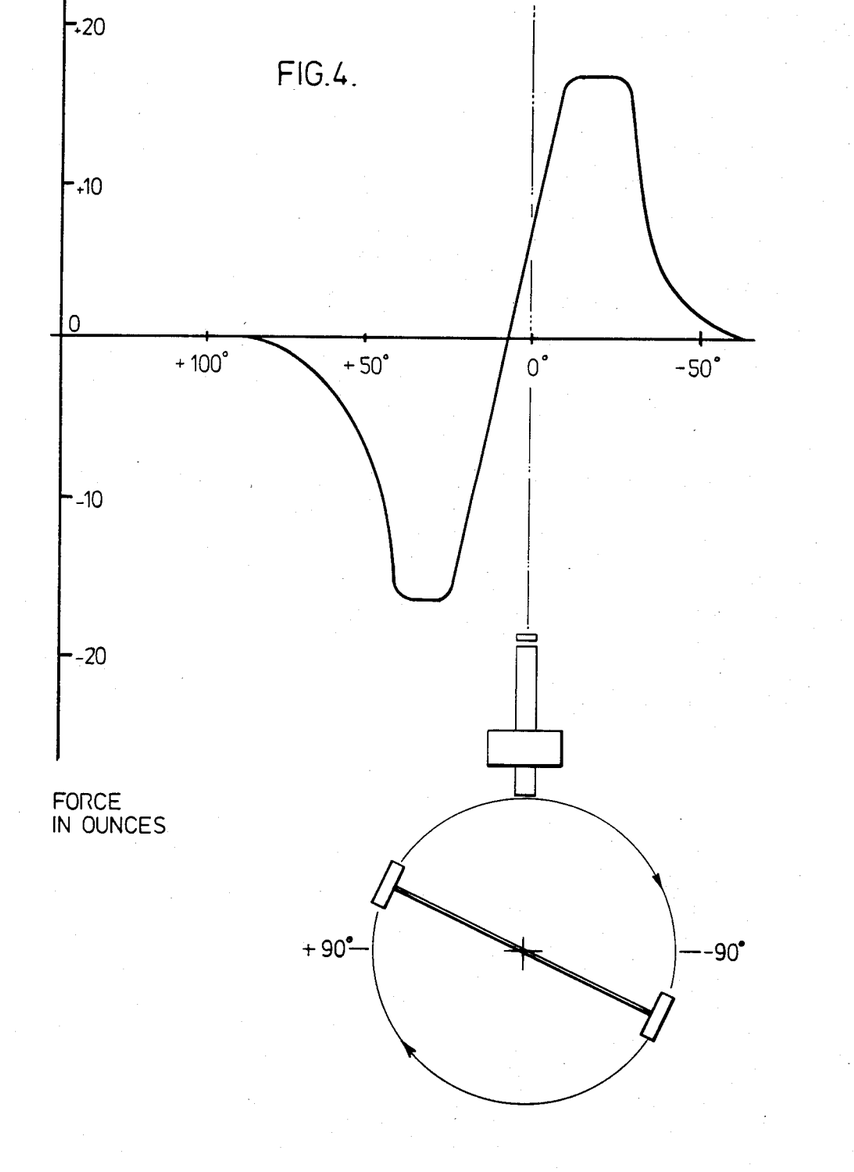
FIG. 4 is a graphical illustration of development of torque using the device of FIG. 3.

On the enclosed graphs of FIGS. 4 and 5, the units to be diverted are shown and the required input to divert this energy for the required time for satisfactory operation is listed as input. Not all the opposing energy was diverted and the net positive units available to assist in rotation of the arm are shown as the total aiding units on the plus side, minus the undiverted units on the negative side.

The efficiency is shown as 28.6% for the preferred clockwise direction of rotation (FIG. 5) while the efficiency for counterclockwise rotation (FIG. 6) is shown as 17.6%. The work available was the same in both cases.

SUMMARY OF DISCLOSURE

In summary of this disclosure, the present invention provides a novel method and novel apparatus for utilizing permanent magnets to do useful work. Modifications are possible within the scope of this invention.

What I claim is:

1. A method of manipulating permanent magnets, which comprises:
    diverting the field of a first permanent magnet by an opposing magnetic field sufficient to permit a second opposing permament magnet to approach the first permanent magnet without the application of undue force,
    restoring the intensity of the field of the first permanent magnet to act on the second permanent magnet to repel the same, and
    harnessing the force resulting from the repulsion of the second magnet by the first magnet on restoring the field to do useful work.

2. The method of claim 1 wherein said force resulting from the repulsion is converted to reciprocal motion.

3. The method of claim 1 wherein said force resulting from the repulsion is converted to rotary motion.

4. A magnet machine comprising:
    a first strong permanent magnet,
    elongate upright side arms of ferromagnetic material operatively associated with said first magnet to establish opposite poles at the ends of said side arms
    electromagnetic coils mounted on each of said side arms between the permanent magnet and the lower end of the arms,
    a magnetic cross-piece traversing the lower ends of the arms, said cross-piece being connected to a pump piston, and
    means for cyclically energizing and de-energizing said electromagnetic coils to generate, upon energizing, a magnetic field to oppose the field of the permanent magnet at the lower end of the arms, thereby to diminish the effect thereof and to cause said cross-piece to fall away from the lower ends so as to move the pump piston in a downward direction, and to restore, upon de-energizing, the magnetic field of the permanent magnet at the lower end of the arms, to cause said cross-piece to be attracted to the lower ends so as to move the pump piston in an upward direction, whereby the resulting repetitive reciprocal movement of the cross-piece effects a pumping action.

5. The magnet machine of claim 4, wherein said permanent magnet comprises a plurality of elongate rectangular strontium ferrite magnets joined together in side-abutting relationship.

6. The magnet machine of claim 4, wherein said coils are located between the permanent magnet and the lower ends of the arms, the lower ends of the arms are traversed by a magnetic cross-piece attracted to the lower ends, and generation of said magnetic field in said coil causes said cross-piece to fall away from the lower ends as a result of diminution of the field of the permanent magnet thereat.

7. A magnet machine, comprising:
    a generally H-shaped magnet assembly comprising:
        a first strong permanent magnet,
        elongate side arms of ferromagnetic material establishing opposite poles at the end thereof,
        and electromagnetic coils mounted on each of said arms between the pemanent magnet and one end of the side arm;
    means for energizing and de-energizing said electromagnetic coils to generate a magnetic field to oppose the field of the permanent magnet at the one end of the arms, thereby to diminish the effect thereof, and
    a second permanent magnet mounted at the radial extremity of a rotary arm for movement in the arc of a circle passing between said one ends of the arms, whereby, when said coils are energized to diminish the magnetic field of said first permanent magnet, movement of said second magnet towards and into the gap between the side arms is permitted and, when said coils are de-energized, the restoration of the magnetic field of said first permanent magnet which results causes said second permanent magnet to be repulsed, whereby rotary motion of the second permanent magnet results.

8. The magnet machine of claim 10 wherein said side arms are oriented radially with respect to the centre of rotation of said rotary arm.

9. The magnet machine of claim 10 wherein said side arms are oriented tangentially with respect to the centre of rotation of said rotary arm.

10. The magnet machine of claim 5 wherein said means for cyclically energizing and de-energizing said electromagnetic coils comprises an electrical circuit comprising:
    a d.c. source of electrical current,
    a first lead connected from said d.c. source to one of said coils, and a second lead connected to said cross-piece,
    series connection between said electrical coils, and
    an electrical connection between the other of the coils and its associated arm, whereby said coils are energized when an electrical circuit is completed upon engagement between said cross-piece and said arms and said coils are de-energized when said cross-piece is disengaged from said arms and the electrical circuit is broken.

* * * * *